(12) United States Patent
Visuri et al.

(10) Patent No.: US 7,688,709 B2
(45) Date of Patent: Mar. 30, 2010

(54) SCHEDULING METHOD, RADIO SYSTEM, BASE STATION, AND SCHEDULING MODULE

(75) Inventors: Samuli Visuri, Helsinki (FI); Bernd Bandemer, Wipfratal (DE)

(73) Assignee: Nokia Corporation, Espoo (FI)

(*) Notice: Subject to any disclaimer, the term of this patent is extended or adjusted under 35 U.S.C. 154(b) by 327 days.

(21) Appl. No.: 11/819,921

(22) Filed: Jun. 29, 2007

(65) Prior Publication Data

US 2008/0058975 A1 Mar. 6, 2008

(51) Int. Cl.
*H04J 11/00* (2006.01)

(52) U.S. Cl. ...................... 370/203; 370/334

(58) Field of Classification Search ............. 370/230, 370/235, 252, 203, 334; 375/260, 267
See application file for complete search history.

(56) References Cited

OTHER PUBLICATIONS

U.S. Appl. No. 11/336,371, filed Oct. 2004, Wu.*
U.S. Appl. No. 11/579,722, filed Jan. 2006, Kim.*

\* cited by examiner

*Primary Examiner*—Kwang B Yao
*Assistant Examiner*—Jung-Jen Liu
(74) *Attorney, Agent, or Firm*—Squire, Sanders & Dempsey L.L.P.

(57) ABSTRACT

There is provided a base station comprising: an estimation unit for estimating a second or higher order statistics for each user terminal in a set of user terminals to be served; an estimation unit for estimating a scheduling metric based on the estimated second or higher order statistics; and a scheduling unit for controlling scheduling based on the estimated scheduling metric.

31 Claims, 3 Drawing Sheets

SCHEDULING METHOD, RADIO SYSTEM, BASE STATION, AND SCHEDULING MODULE

FIELD

The invention relates to a scheduling method, to a radio system, to a base station, to a scheduling module, to a computer program product, and to a computer program distribution medium.

BACKGROUND

In a multi-user multiple-input multiple-output (MIMO) uplink channel, the presence of multiple receive antennas enables a base station to serve a number of users simultaneously, thus increasing overall system throughput. In practice, users have to be scheduled instead of being served all at once. In the MIMO uplink channel, several transmitters (e.g. user terminals) send data to a single receiver (e.g. base station) simultaneously. Such a concurrent transmission is enabled by the presence of multiple antennas at the base station, which can apply spatial processing to separate data streams. Having multiple antennas, the base station is able to receive data streams from several users concurrently by exploiting the spatial properties of the transmission channel, resulting in a significantly enhanced system throughput. The concept of serving several users at the same resource is sometimes also referred to as "Virtual MIMO".

A practical problem in this situation is the difficulty of selecting a suitably small user subset for simultaneous transmission (multi-user scheduling). The number of simultaneously decodable independent data streams is in practice limited by the number of receive antennas at the base station; therefore, it is usually not possible to serve all the users in the same resource unit. Instead, a subset of users has to be selected by the base station for simultaneous transmission. A spatial compatibility metric (scheduling metric) is used for evaluating which users can be beneficially grouped together. Based on a scheduling metric, a scheduling algorithm is employed which checks certain candidate groupings via their respective compatibility metric value, and it finally makes a scheduling decision. A straight-forward scheduling algorithm is an exhaustive search which probes all possible user combinations and picks the one with the best scheduling metric. However, this approach is often practically infeasible due to its excessive computational complexity.

Suboptimal scheduling algorithms aiming at reduced complexity have been proposed, e.g., based on sequential scheduling, simulated annealing, and a tree data structure. As a scheduling metric, instantaneous channel capacity, resulting SINR, or related measures such as the minimal transmit power necessary for achieving a given target performance have been proposed. However, these known approaches are based on instantaneous channel knowledge, such as SINR, or capacity used for calculating the scheduling metric. This makes the amount of required channel sounding at each transmission band excessive at the scheduling stage, thus increasing the usage of radio system resources.

SUMMARY OF THE INVENTION

An object of the invention is to provide an improved scheduling method, an improved radio system, an improved base station, an improved scheduling module and an improved computer-readable distribution medium.

According to an aspect of the invention, there is provided a scheduling method comprising: providing an estimated second or higher order statistics for each user terminal in a set of user terminals to be served; estimating a scheduling metric based on the estimated second or higher order statistics; and controlling scheduling based on the estimated scheduling metric.

According to another aspect of the invention, there is provided a radio system comprising a base station and one or more user terminals communicating with the base station. The radio system comprises: an estimation unit for estimating a second or higher order statistics for each user terminal in a set of user terminals to be served; an estimation unit for estimating a scheduling metric based on the estimated second or higher order statistics; and a scheduling unit for controlling scheduling based on the estimated scheduling metric.

According to another aspect of the invention, there is provided a base station comprising: an estimation unit for estimating a second or higher order statistics for each user terminal in a set of user terminals to be served; an estimation unit for estimating a scheduling metric based on the estimated second or higher order statistics; and a scheduling unit for controlling scheduling based on the estimated scheduling metric.

According to another aspect of the invention, there is provided a scheduling module for a radio system, comprising: an estimation unit for estimating a scheduling metric based on second or higher order statistics of each user terminal in a set of user terminals to be served; and a control unit for providing information for controlling scheduling based on the estimated scheduling metric.

According to another aspect of the invention, there is provided a scheduling module for a radio system, comprising: estimation means for estimating a scheduling metric based on second or higher order statistics of each user terminal in a set of user terminals to be served; and processing means for providing information for controlling scheduling based on the estimated scheduling metric.

According to another aspect of the invention, there is provided a computer-readable distribution medium having computer executable components for executing a computer process for scheduling. The process comprises: providing an estimated second or higher order statistics for each user terminal in a set of user terminals to be served; estimating a scheduling metric based on the estimated second or higher order statistics; and controlling scheduling based on the estimated scheduling metric.

The invention provides several advantages.

An important advantage of the proposed solution is its flexibility. It can be combined with any scheduling algorithm. For example, quality of service requirements can be included through a scheduling algorithm that weighs the scheduling metric of the proposed solution according to user priorities.

Further, only long-term channel state information is required, which makes the proposed solution robust and also computationally attractive. Since only long-term channel knowledge is required, the amount of required channel sounding is significantly reduced. This makes the proposed solution robust against the effects of estimation latency and fast-paced channel variations. It is unnecessary in the scheduling stage to sound the channel in every subband. Instead, once channel knowledge has been obtained in one subband, it can be reused in the neighboring frequency regions.

BRIEF DESCRIPTION OF THE DRAWINGS

In the following, the invention will be described in greater detail with reference to the embodiments and the accompanying drawings, in which.

DETAILED DESCRIPTION OF PREFERRED EMBODIMENTS

Figure 1:
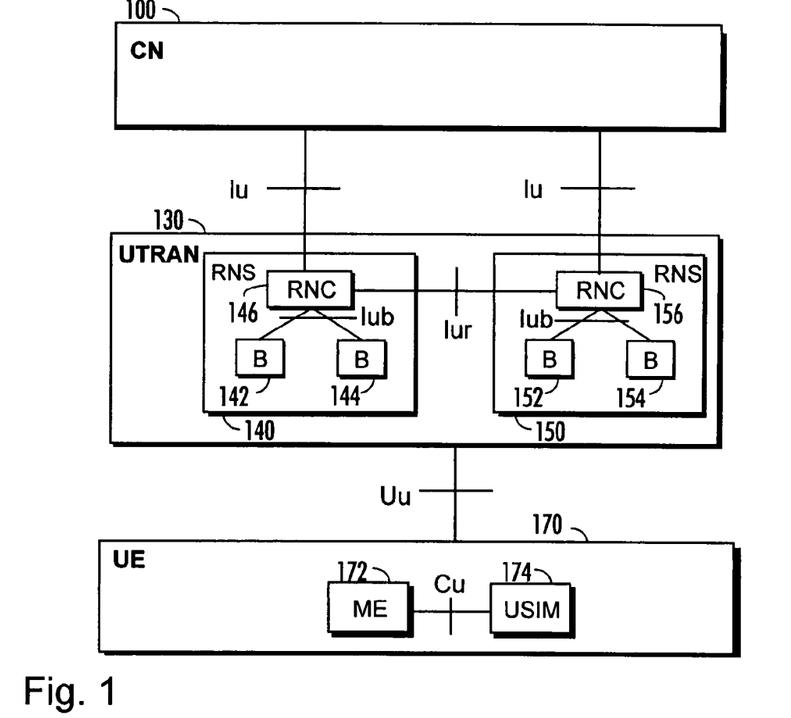
FIG. 1 shows an example of a radio system.

FIG. 1 illustrates an example of a radio system to which embodiments of the invention can be applied. A radio system in FIG. 1, known at least as UTRAN [UMTS (Universal Mobile Telecommunications System) Terrestrial Radio Access Network] 130, is taken as an example. The UTRAN belongs to the third generation and is implemented with WCDMA (Wideband Code Division Multiple Access) technology. The solution is not limited to a WCDMA radio interface but applications exist which are implemented with cdma2000, MC-CDMA (MultiCarrier Code Division Multiple Access) or OFDMA (Orthogonal Frequency Division Multiple Access) technologies without restricting the invention to the above-mentioned technologies.

FIG. 1 is a simplified block diagram showing the most important parts of a radio system and interfaces between them at a network-element level. The structure and functions of the network elements are not described in detail, because they are generally known.

The main parts of a radio system are a core network (CN) 100, a radio access network 130 and a terminal (UE) 170. The term UTRAN is short for UMTS Terrestrial Radio Access Network, i.e. the radio access network 130 belongs to the third generation and is implemented by wideband code division multiple access (WCDMA) technology. The main elements of the UTRAN are a radio network controller (RNC) 146, 156, Node Bs 142, 144, 152, 154 and user a terminal 170. The UTRAN is attached to the existing GSM core network 100 via an interface called Iu. This interface is supported by the RNC 146, 156, which manages a set of base stations called Node Bs 142, 144, 152, 154 through interfaces called Iub. The UTRAN is largely autonomous from the core network 100 since the RNCs 146, 156 are interconnected by the Iur interface.

On a general level, the radio system can also be defined to comprise a user, such as a subscriber terminal or a mobile phone, and a network part, which comprises the fixed infrastructure of the radio system, i.e. the core network, radio access network and base station system.

From the point of view of Node B 142, 144, 152, 154, i.e. a base station, there is one controlling RNC 146, 156 where its Iub interface terminates. The controlling RNC 146, 156 also takes care of admission control for new mobiles or services attempting to use the Node B 142, 144, 152, 154. The controlling RNC 146, 156 and its Node Bs 142, 144, 152, 154 form an RNS (Radio Network Subsystem) 140, 150.

The terminal 170 may comprise mobile equipment (ME) 172 and a UMTS subscriber identity module (USIM) 174. The USIM 174 contains information related to the user and information related to information security in particular, for instance, an encryption algorithm.

In UMTS networks, the terminal 170 can be simultaneously connected to a plurality of Node Bs in the occurrence of soft handover.

From the point of view of the terminal 170, a serving RNC 146, 156 is provided which terminates the mobile link layer communications. From the point of view of the CN 100, the serving RNC 146, 156 terminates the Iu for this terminal 170. The serving RNC 146, 156 also takes care of admission control for new mobiles or services attempting to use the CN 100 over its Iu interface.

In the UMTS, the most important interfaces between network elements are the Iu interface between the CN 100 and the radio access network 130, which is divided into the interface IuCS on the circuit-switched side and the interface IuPS on the packet-switched side, and the Uu interface between the radio access network and the terminal.

Figure 2:
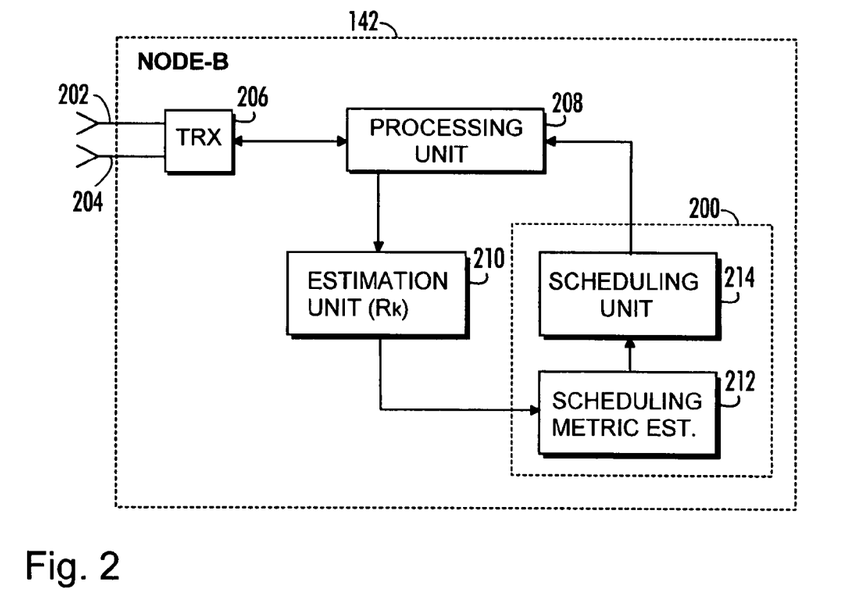
FIG. 2 illustrates an example of a base station according to an embodiment of the present invention.

FIG. 2 shows a simplified outline of an embodiment of the present invention. An exemplary base station 142 of FIG. 2 comprises multiple antennas 202, 204 for receiving data streams from several user terminals concurrently. The base station 142 may also comprise the following elements: one or more transceiver units 206, a processing unit 208 for controlling the functions of the base station, an estimation unit 210 for estimating second or higher order statistics, an estimation unit 212 for estimating scheduling metrics, and a scheduling unit 214.

In an embodiment, the estimation unit 212 for estimating the scheduling metric and the scheduling unit 214 are part of a scheduling module 200 of the base station 142. However, it is also possible that the scheduling unit 214 and the estimation unit 212 are located in some other part of the base station or the radio system.

In an embodiment, the estimation unit 210 is configured to estimate the second or higher order statistics for each user terminal in a set of user terminals to be served. The estimated second or higher order statistics of each user terminal k may have the form of:

$$E\{H_k H_k^H\} \in C^{M_R \times M_{R_k}},$$

where $H_k \in C^{M_R \times M_T}$ is a channel matrix for the kth user terminal, E denotes a mathematical expectation, and $M_T$ and $M_R$ are the numbers of transmit and receive antennas.

In an embodiment, the estimation unit 212 for estimating the scheduling metric is configured to estimate an ergodic sum capacity of multiple access channels based on the second or higher order statistics received from the estimation unit 210. The estimation unit 212 is further configured to estimate the scheduling metric based on the estimated ergodic sum capacity.

In an embodiment, the estimation unit 212 is configured to estimate the ergodic sum capacity of multiple access channels by using a second-order Taylor series of the ergodic sum capacity.

The scheduling unit 214 is configured to control scheduling based on the estimated scheduling metric by using any suitable scheduling algorithm.

Let us next study some theoretical basis of the proposed solution. In the following example, all expressions refer to a frequency-flat case. In the case of a frequency selective channel, the implementation example can be applied in the same way on each resource unit of an Orthogonal Frequency Division Multiplex (OFDM) system by taking into account that the channel statistics in the case of the channel model stated below do not depend on the subcarrier index of an OFDM system.

A frequency-flat MIMO transmission channel can be modeled as y=Hx+n, where x and y are transmit and receive vectors, $H \in C^{M_R \times M_T}$ is the joint channel matrix of all user terminals, and $M_T$ and $M_R$ are the number of transmit and receive antennas, respectively. Further, n is zero-mean, circularly symmetric additive Gaussian noise with per-component variance NO, i.e., $E\{nn^H\}=N_o I_{M_R}$. The channel matrix H can be given as: $H=[H_1, H_2, \ldots, H_K] \in C^{M_R \times M_T}$.

For deriving the scheduling metric, let us assume K active user terminals k=1, . . . , K having $M_{T,k}$ transmit antennas, respectively. The total number of transmit antennas is, thus, $$M_T = \sum_{k=1}^{K} M_{T,k},$$

which is complemented by $M_R$ receive antennas at the base station.

Let the channel matrix $H_k \in C^{M_R \times M_{T,k}}$ of each user terminal k be modeled as:

$$H_k = R_k^{1/2} H_{w,k} \in C^{M_R \times M_{T,k}} \quad (1)$$

where $R_k \in C^{M_R \times M_R}$ is a receiver side correlation matrix for a kth user, and $H_{w,k}$ is a matrix containing independent, Rayleigh-fading random channel coefficient elements of unit average power. For each user terminal k, the matrix $R_k$ mainly depends on the geometry of the current propagation situation of that user terminal, as well as on different properties of the base station, such as the type of antenna array used. While $H_{w,k}$ constitutes the fast-changing components of $H_k$, the correlation matrix $R_k$ only contains the slowly changing components ("long-term channel knowledge"). In addition, $R_k$ is constant across neighboring frequency bands as long as the total bandwidth is small compared to the carrier frequency.

When a certain set of users $S \subset \{1, 2, \ldots, K\}$ is tested for possible scheduling, a natural measure of performance is information on the theoretic capacity of a multi-user channel related to S. Assuming that only the $R_k$, k=1, . . . , K are known to the base station, the ergodic sum capacity of multiple access channels corresponding to S is given by:

$$C_S(\rho) = E\left\{\log \det\left(I_{M_R} + \rho \sum_{i \in S} H_i H_i^H\right)\right\} \quad (2)$$

where $$\rho = \frac{E_S}{M_T N_0}$$

is a normalized SNR value and the expectation is with respect to the fast fading terms $H_{w,k}$. Because the exact $C_S(\rho)$ has to be calculated by Monte Carlo simulations, its direct use in practice is not possible. Therefore, the second-order Taylor series of $C_S(\rho)$ developed at $\rho_0=0$ can be used. It can be expressed by:

$$C_S(\rho) \approx \rho \cdot E\left\{\text{trace}\left(\sum_{i \in S} H_i H_i^H\right)\right\} - \frac{\rho^2}{2} \cdot E\left\{\text{trace}\left(\left(\sum_{i \in S} H_i H_i^H\right)^2\right)\right\} \quad (3)$$

where ρ is a tuning constant, E is a mathematical expectation, $H_i$ is a channel for user terminal i, and $H_i^H$ is a Hermitian conjugate of $H_i$.

The linear and quadratic coefficients can be computed from the channel model described above in equation (3). They can be expressed by:

$$E\left\{\text{trace}\left(\sum_{i \in S} H_i H_i^H\right)\right\} = \sum_{k \in S} M_{T,k} \text{ trace}(R_k) \quad (4)$$

$$\left\{\text{trace}\left(\left(\sum_{i \in S} H_i H_i^H\right)^2\right)\right\} = \quad (5)$$

$$\sum_{k \in S} \sum_{l \in S} M_{T,k} M_{T,l} \text{ trace}(R_k R_l) + \sum_{k \in S} M_{T,k} \text{ trace}(R_k)^2.$$

Finally, using the expected value results from equations (4) and (5) in the capacity approximation (3), a good approximation of the ergodic sum capacity of the user set S can be given by:

$$C_S(\rho) \approx \rho \cdot \sum_{k=1}^{K} M_{T,k} \text{ trace}(R_k) - \quad (6)$$

$$\frac{\rho^2}{2} \cdot \left(\sum_{k=1}^{K} \sum_{l=1}^{K} M_{T,k} M_{T,l} \text{ trace}(R_k R_l) + \sum_{k=1}^{K} M_{T,k} \text{ trace}(R_k)^2\right).$$

The approximation of equation (6) enables the base station to obtain an estimate of the sum capacity by only using the receiver-side correlation matrices $R_k$.

In an embodiment, an exemplary implementation can, thus, comprise:

1. The base station determines a set of $K_{total}$ users that need to be served,
2. The base station obtains estimates of second or higher order statistics in the form of $R_k$ for each user,
3. The base station makes a scheduling decision based on the scheduling metric in equation (6) by using a suitable design parameter $\rho = \rho_{ref}$ and an appropriate scheduling algorithm,
4. The base station grants transmit permission to the selected users.

In an embodiment, the trace expressions in equation (6) can be precomputed for each user k or user pair (k,l), respectively, thus reducing the effort for testing each candidate S to a relatively low number of additions. Since the metric is generated from a Taylor series developed at $\rho_0=0$, it is beneficial to use low values $\rho_{ref}$ for the metric computation even though the true ρ may, in fact, be much higher. The value of $\rho_{ref}$ in use can be subjected to optimization.

There are different possibilities in choosing scheduling algorithms using a scheduling metric. In an embodiment, an opportunistic scheduling can be used. In opportunistic scheduling, it is assumed that out of $K_{total}$ users exactly $K_{group}$ users are selected for service. Of the $$\binom{K_{total}}{K_{group}}$$

possible groups (i.e. possible sets S), a scheduler has to select the one with the maximum metric according to equation (6). This can be carried out by an exhaustive search or, in order to reduce the computation burden, by suboptimal search approaches.

In an embodiment, a round-robin (RR) based fair scheduling can be used. In the opportunistic scheduling scheme, it may occur that the far away or strongly coupled users never become scheduled (starvation). This situation can be avoided in the following way: in each scheduling run, one user is predetermined to be included in a subset to be served. This "free ticket" user is chosen in a round-robin fashion, thus providing fairness. The remaining members of the subset to be served are chosen according to the scheduling metric of equation (6). Since one user is fixed, exactly $$\binom{K_{total}-1}{K_{group}-1}$$

possible subsets remain to be tested. Once again, either exhaustive or suboptimal search approaches can be used.

The proposed scheduling metric can also be combined with any other scheduling algorithms than those described above. For instance, QoS requirements can be included in the system through a scheduling algorithm that weighs the metric according to user priorities. In addition, only long-term CSI is required, which makes the scheduling metric robust and also computationally attractive.

Let us next consider the following situation: a total number of $K_{total}$ user terminals wishes to transmit data to a single base station which comprises $M_R > 1$ receive antennas. Multiple user terminals can be accommodated concurrently by exploiting the spatial properties of the joint transmission channel. However, the number of simultaneously decodable streams is in practice limited by $M_R$; therefore it often occurs that not all user terminals can be served within the same resource unit. A subset of user terminals has to be selected, which is a process also known as multiuser scheduling.

A number of scheduling algorithms is known. A common feature of these schemes is that a metric is needed to evaluate a possible set of user terminals for spatial compatibility among its members. In an embodiment, the sum capacity approximation of equation (6) can be used as a scheduling metric. For each potential user group G, a group-wise scheduling metric is defined:

$$M_{group}(G)^{def} = C_{erg}^{G}(\rho_{ref}) \quad (7)$$

where $C_{erg}^{G}$ is the ergodic capacity estimate given in equation (6) when applied to the user group G. It is evaluated at the normalized SNR value $\rho_{ref}$ which in practice may be chosen to differ from the true SNR $\rho$. Once the scheduling metric has been chosen as a function that evaluates potential user groups, different approaches are feasible for selecting the best group.

In an embodiment, exactly $K_{group}$ out of $K_{total}$ users are served, while the others are disregarded. The set of active users is determined as:

$$G = \arg\max_{\substack{\chi \subset \{1,2,\ldots,K_{total}\} \\ |\chi|=K_{group}}} M_{group}(\chi),$$

where $M_{group}(G)$ is the group-wise metric defined in equation (7). The number of candidate groups the maximization operates upon is $$\binom{K_{total}}{K_{group}},$$

which is the main influence on the complexity when an exhaustive search is applied.

The users that are not within G, i.e., those from $\{1, 2, \ldots, K_{total}\} - G$, may be served in a sufficiently spaced frequency band where $R_k$ matrices result in a different set of active users. Alternatively, the users can be required to wait until their channel conditions improve. It is possible that users with a weak channel or strong mutual coupling are never served (starvation); thus, this approach may lack fairness.

In an embodiment, metric-based scheduling is combined with a fairness-based scheduling rule as follows. When $K_{group}$ out of $K_{total}$ users are to be selected, the total group G is split into two parts, $G = G^{(1)} \cup G^{(2)}$, with preset cardinalities $|G^{(1)}| = K_{group}^{(1)}|$ and $|G^{(2)}| = K_{group}^{(2)}|$, where $K_{group} = K_{group}^{(1)} + K_{group}^{(2)}$.

The first part, $G^{(1)}$, is chosen independently of the channel knowledge. It constitutes the fairness component of the combined scheme. One possibility is to select the $K_{group}^{(1)}$ users that have not been scheduled for the longest time. Another possibility is to assign $G^{(1)}$ in a round-robin fashion, i.e. users $1, \ldots, K_{group}^{(1)}$ are selected in the first run, users $K_{group}^{(1)}+1, \ldots, 2K_{group}^{(1)}$ in the second run, and so forth. Thus, $G^{(1)}$ is chosen independently of $R_k$. The second part of the group, $G^{(2)}$, can be assigned based on the metric, using a best-subset approach as before, $$G^2 = \arg\max_{\substack{\chi \subset \{1,2,\ldots,K_{total}\} \\ |\chi|=K_{group}^{(2)} \\ \chi \cap G^{(1)}=0}} M_{group}(\chi \cup G^{(1)}).$$

In this case, the number of candidates for the maximization can be computed as $$\binom{K_{total} - K_{group}^{(1)}}{K_{group}^{(2)}}.$$

By choosing the decomposition of $K_{group}$ into its summands $K_{group}^{(1)}$ and $K_{group}^{(2)}$, the trade-off between capacity maximization and fairness can be adjusted. The extreme case $K_{group}^{(1)} = 0$ is equivalent to the best subset approach described above. On the other hand, choosing $K_{group}^{(2)} = 0$ totally disregards channel state information and focuses solely on fairness.

In an embodiment, a more stringent notion of fairness than that described above can be formulated as follows: within a certain predetermined time frame, all users can be scheduled equally often. Let us assume that during this time frame, the channel state information is static, i.e., the $R_k$ do not change. Further, we restrict the consideration to the special case where each user is to be scheduled exactly once during the given time frame.

Assuming that $K_{group}$ is an integer divider of $K_{total}$, this means that the entire user set $\{1, 2, \ldots, K_{total}\}$ must be partitioned into $N=K_{total}/K_{group}$ subsets of size $K_{group}$. The users within any subset are then served concurrently, while different subsets are assigned e.g. different timeslots. Let the best partition be denoted by $P=\{G_1, G_2, \ldots, G_N\}$, where $|G_n|=K_{group}, \forall n$. A natural metric to measure the fitness of a partition is the average of the group-wise metrics as defined in equation (7), namely:

$$M_{partition}(\mathcal{P}) \stackrel{def}{=} \frac{1}{N}\sum_{n=1}^{N} M_{group}(\mathcal{G}_n) \tag{8}$$

The best partition must then fulfill: $P=\arg_{x\_a\_valid\_partition}$ max $M_{partition}(\chi)$. The number of candidate partitions for the maximization is $$\frac{K_{total}!}{N!(K_{group}!)^N}.$$

By combining equations (8) and (7), it can be seen that the optimal choice P is independent of $\rho_{ref}$. Thus, the scheduling decision made by the best partition approach does not depend on this parameter.

Figure 3:
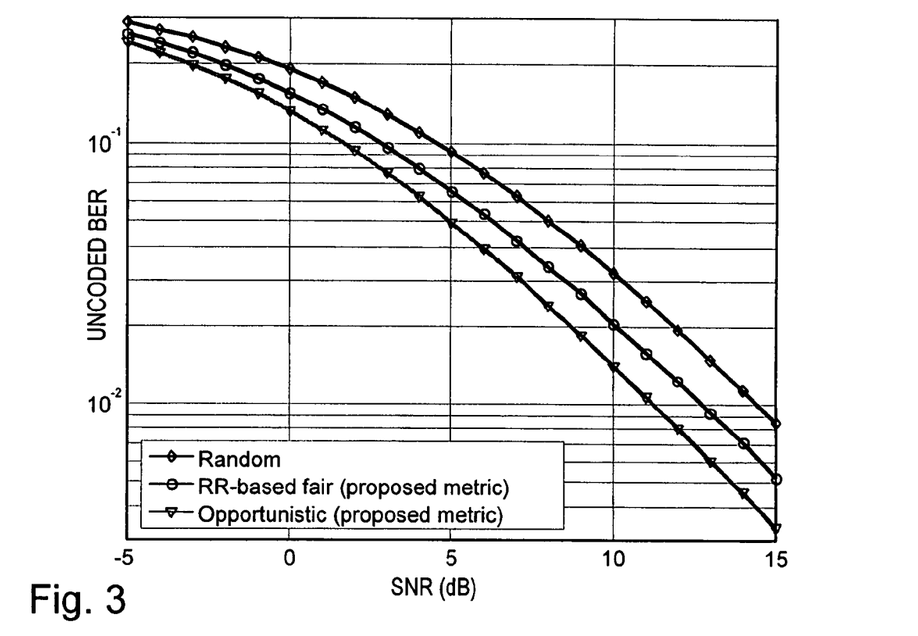
FIG. 3 illustrates uncoded bit error rates for different scheduling schemes.
Figure 4:
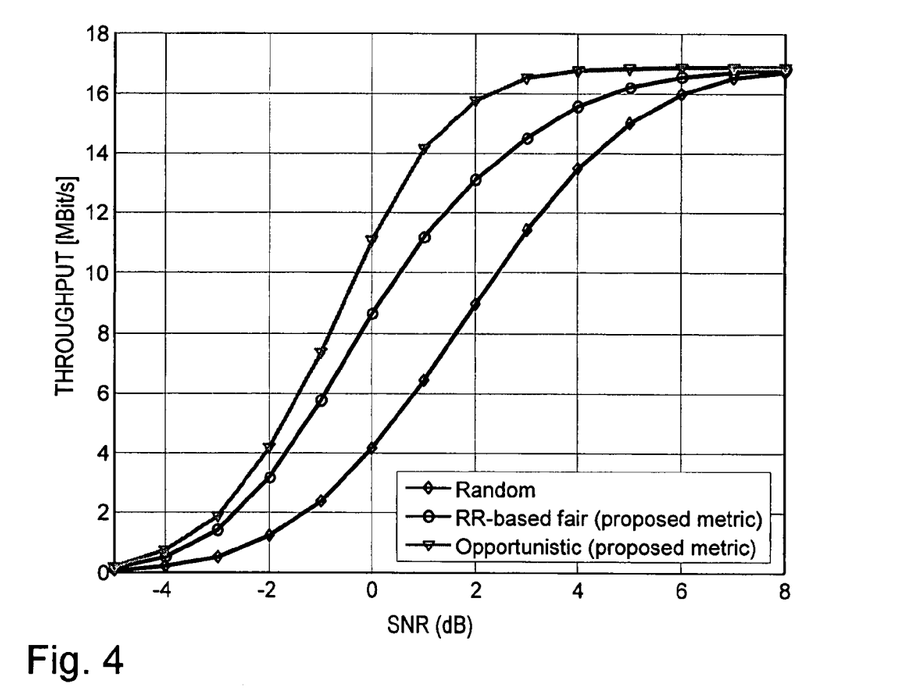
FIG. 4 illustrates throughput curves for different scheduling schemes.

FIGS. 3 and 4 illustrate the performance of a system using the proposed scheduling metric over a system with random scheduling. The curves are for a case with two base station antennas and two active user terminals out of six total user terminals, where each user terminal has a single antenna. The parameters used are $M_R=2$, $M_{T,k}=1$, $K_{total}=6$, $K_{group}=2$, and $\rho_{ref}=-10$ dB. A channel model, SCM C2 (Urban macro) with $v_{mobile}=3$ km/h was used for the figures. The applied modulation is QPSK (Quadrature Phase Shift Keying) and the channel code is a standard 3GPP turbo code with rate ½. An exhaustive search was used. FIG. 3 illustrates uncoded bit error rate curves while FIG. 4 presents the overall system throughput. Based on the figures, it can be seen that the performance of the system using the scheduling metric according to an embodiment is superior over a system using random scheduling.

Figure 5:
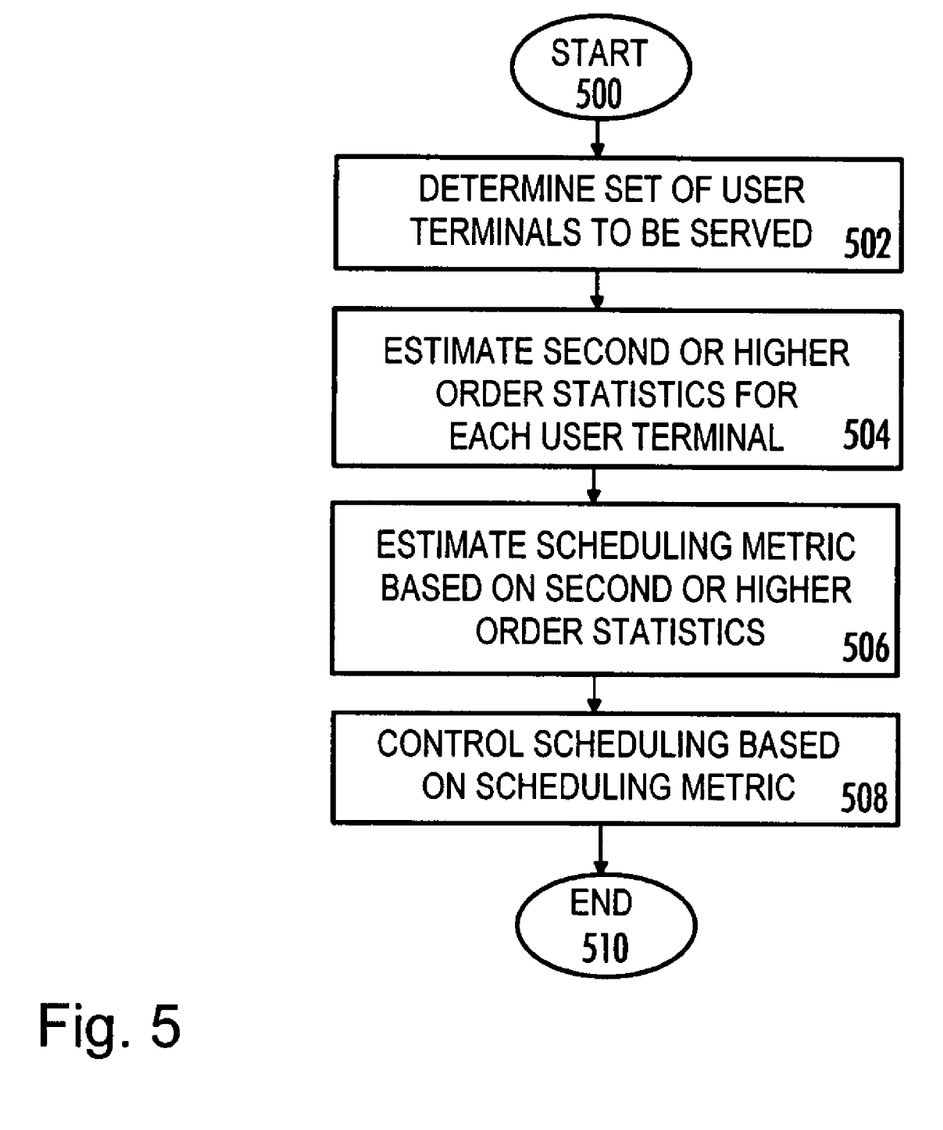
FIG. 5 illustrates an example of a scheduling method according to an embodiment of the present invention.

Finally, FIG. 5 illustrates a scheduling method according to an embodiment. The method starts in 500. In 502, a set of user terminals to be served is determined in a base station. In 504, a second or higher order statistics is estimated for each user terminal of the determined set of user terminals. In 506, a scheduling metric is estimated on the basis of the estimated second or higher order statistics. In 508, scheduling is controlled on the basis of the estimated scheduling metric. The method ends in 510.

The embodiments of the invention may be realized in a radio system module comprising a processing unit. The processing unit may be configured to perform at least some of the steps described in connection with the flowchart of FIG. 5. The embodiments may be implemented as a computer program comprising instructions for executing a computer process for controlling scheduling.

The computer program may be stored on a computer program distribution medium readable by a computer or a processor. The computer program medium may be, for example but not limited to, semiconductor system or device. The computer program medium may include at least one of the following media: a computer readable medium, a program storage medium, a record medium, a computer readable memory, a random access memory, an erasable programmable read-only memory, a computer readable software distribution package, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method comprising:
   providing, by a processor, an estimated second or higher order statistics for each user terminal in a set of user terminals to be served;
   estimating, by the processor, an ergodic sum capacity of multiple access channels based on the estimated second or higher order statistics;
   estimating, by the processor, a scheduling metric based on the estimated ergodic sum capacity; and
   controlling, by the processor, scheduling based on the estimated scheduling metric.

2. The method of claim 1, wherein the estimated second or higher order statistics for each user terminal k has the form of:

$$E\{H_k H_k^H\} \in C^{M_R \times M_{R_k}},$$

where $H_k \in C^{M_R \times M_T}$ is a channel matrix for a kth user terminal, E denotes a mathematical expectation, and $M_T$ and $M_R$ are the numbers of transmit and receive antennas.

3. The method of claim 1, further comprising estimating the ergodic sum capacity of multiple access channels by using a second-order Taylor series of the ergodic sum capacity.

4. The method of claim 1, wherein the estimated scheduling metric has the form of:

$$C_S(\rho) = \rho \cdot E\left\{\text{trace}\left(\sum_{i \in S} H_i H_i^H\right)\right\} - \frac{\rho^2}{2} \cdot E\left\{\text{trace}\left(\left(\sum_{i \in S} H_i H_i^H\right)^2\right)\right\}$$

where $\rho$ is a tuning constant, E is a mathematical expectation, $H_i$ is a channel for user terminal i, and $H_i^H$ is a Hermitian conjugate of $H_i$.

5. The method of claim 4, further comprising:
   precomputing trace expressions for each user terminal or user terminal pair before estimating the scheduling metric.

6. The method of claim 1, wherein the estimated scheduling metric has the form of:

$$C_S(\rho) = \rho \cdot \sum_{k=1}^{K} M_{T,k} \text{trace}(R_k) - \frac{\rho^2}{2} \cdot \left(\sum_{k=1}^{K}\sum_{l=1}^{K} M_{T,k} M_{T,l} \text{trace}(R_k R_l) + \sum_{k=1}^{K} M_{T,k} \text{trace}(R_k)^2\right)$$

where $\rho$ is a tuning constant, $M_{T,k}$ is a number of transmit antennas of a kth user terminal, $R_k$ is a receiver side correlation matrix for the kth user terminal, $M_{T,l}$ is a number of transmit antennas of an lth user terminal, and $R_l$ is a receiver side correlation matrix for the lth user terminal.

7. The method of claim 1, further comprising:
using a scheduling algorithm for controlling scheduling based on the estimated scheduling metric.

8. The method of claim 7, further comprising:
using an opportunistic scheduling algorithm for controlling scheduling.

9. The method of claim 7, further comprising:
using a round-robin based fair scheduling for controlling scheduling.

10. A system comprising:
a base station;
one or more user terminals communicating with the base station;
an estimation unit for estimating a second or higher order statistics for each user terminal in a set of user terminals to be served;
an estimation unit for estimating an ergodic sum capacity of multiple access channels based on the estimated second or higher order statistics;
an estimation unit for estimating a scheduling metric based on the estimated ergodic sum capacity; and
a scheduling unit for controlling scheduling based on the estimated scheduling metric.

11. The system of claim 10, wherein the estimated scheduling metric has the form of:

$$C_S(\rho) = \rho \cdot E\left\{\text{trace}\left(\sum_{i \in S} H_i H_i^H\right)\right\} - \frac{\rho^2}{2} \cdot E\left\{\text{trace}\left(\left(\sum_{i \in S} H_i H_i^H\right)^2\right)\right\}$$

where $\rho$ is a tuning constant, E is a mathematical expectation, $H_i$ is a channel for user terminal i, and $H_i^H$ is a Hermitian conjugate of $H_i$.

12. An apparatus, comprising:
a processor;
a memory including a computer program code,
wherein the memory and the computer program code are configured, with the processor, to cause the apparatus, at least, to
estimate a second or higher order statistics for each user terminal in a set of user terminals to be served;
estimate an ergodic sum capacity of multiple access channels based on the estimated second or higher order statistics;
estimate a scheduling metric based on the estimated ergodic sum capacity; and
control scheduling based on the estimated scheduling metric.

13. The apparatus of claim 12, wherein the estimated second or higher order statistics of each user terminal k has the form of:

$$E\{H_k H_k^H\} \in C^{M_R \times M_{R_k}},$$

where $H_k \in C^{M_R \times M_T}$ is a channel matrix for a kth user terminal, E denotes a mathematical expectation, and $M_T$ and $M_R$ are the numbers of transmit and receive antennas.

14. The apparatus of claim 13, wherein the memory and the computer program code are further configured, with the processor, to cause the apparatus to estimate the ergodic sum capacity of multiple access channels using a second-order Taylor series of the ergodic sum capacity for estimating the ergodic sum capacity.

15. The apparatus of claim 12, wherein the estimated scheduling metric has the form of:

$$C_S(\rho) = \rho \cdot E\left\{\text{trace}\left(\sum_{i \in S} H_i H_i^H\right)\right\} - \frac{\rho^2}{2} \cdot E\left\{\text{trace}\left(\left(\sum_{i \in S} H_i H_i^H\right)^2\right)\right\}$$

where $\rho$ is a tuning constant, E is a mathematical expectation, $H_i$ is a channel for user terminal i, and $H_i^H$ is a Hermitian conjugate of $H_i$.

16. The apparatus of claim 15, wherein the memory and the computer program code are further configured, with the processor, to cause the apparatus to precompute trace expressions for each user terminal or user terminal pair before estimating the scheduling metric.

17. The apparatus of claim 12, wherein the estimated scheduling metric has the form of:

$$C_S(\rho) = \rho \cdot \sum_{k=1}^{K} M_{T,k} \text{trace}(R_k) -$$
$$\frac{\rho^2}{2} \cdot \left(\sum_{k=1}^{K}\sum_{l=1}^{K} M_{T,k} M_{T,l} \text{trace}(R_k R_l) + \sum_{k=1}^{K} M_{T,k} \text{trace}(R_k)^2\right)$$

where $\rho$ is a tuning constant, $M_{T,k}$ is a number of transmit antennas of a Kth user terminal, $R_k$ is the receiver side correlation matrix for the kth user terminal, $M_{T,l}$ is the number of transmit antennas of an lth user terminal, and $R_l$ is a receiver side correlation matrix for the lth user terminal.

18. The apparatus of claim 12, wherein the memory and the computer program code are further configured, with the processor, to cause the apparatus to use a scheduling algorithm to control scheduling based on the estimated scheduling metric.

19. An apparatus, comprising:
a processor;
a memory including a computer program code,
wherein the memory and the computer program code are configured, with the processor, to cause the apparatus, at least, to
estimate an ergodic sum capacity of multiple access channels based on estimated second or higher order statistics of each user terminal in a set of user terminals to be served;
estimate a scheduling metric based on the estimated ergodic sum capacity; and
provide information for controlling scheduling based on the estimated scheduling metric.

20. The apparatus of claim 19, wherein the estimated second or higher order statistics of each user terminal k has the form of:

$$E\{H_k H_k^H\} \in C^{M_R \times M_{R_k}},$$

where $H_k \in C^{M_R \times M_T}$ is a channel matrix for the kth user terminal, E denotes a mathematical expectation, and $M_T$ and $M_R$ are the numbers of transmit and receive antennas.

21. The apparatus of claim 19, wherein the memory and the computer program code are further configured, with the processor, to cause the apparatus to estimate the ergodic sum capacity of multiple access channels using a second-order Taylor series of the ergodic sum capacity for estimating the ergodic sum capacity.

22. The apparatus of claim 19, wherein the estimated scheduling metric has the form of:

$$C_S(\rho) = \rho \cdot E\left\{\text{trace}\left(\sum_{i \in S} H_i H_i^H\right)\right\} - \frac{\rho^2}{2} \cdot E\left\{\text{trace}\left(\left(\sum_{i \in S} H_i H_i^H\right)^2\right)\right\}$$

where $\rho$ is a tuning constant, E is a mathematical expectation, $H_i$ is a channel for user terminal i, and $H_i^H$ is a Hermitian conjugate of $H_i$.

23. The apparatus of claim 22, wherein the memory and the computer program code are further configured, with the processor, to cause the apparatus to pre-compute trace expressions for each user terminal or user terminal pair before estimating of the scheduling metric.

24. The apparatus of claim 19, wherein the estimated scheduling metric has the form of:

$$C_S(\rho) = \rho \cdot \sum_{k=1}^{K} M_{T,k} \text{ trace}(R_k) - \frac{\rho^2}{2} \cdot \left(\sum_{k=1}^{K}\sum_{l=1}^{K} M_{T,k} M_{T,l} \text{ trace}(R_k R_l) + \sum_{k=1}^{K} M_{T,k} \text{ trace}(R_k)^2\right)$$

where $\rho$ is a tuning constant, $M_{T,k}$ is a number of transmit antennas of a kth user terminal, $R_k$ is a receiver side correlation matrix for the kth user terminal, $M_{T,l}$ is a number of transmit antennas of an lth user terminal, and $R_l$ is the receiver side correlation matrix for the lth user terminal.

25. The apparatus of claim 19, wherein the memory and the computer program code are further configured, with the processor, to cause the apparatus to use a scheduling algorithm to control scheduling based on the estimated scheduling metric.

26. The apparatus of claim 25, wherein the memory and the computer program code are further configured, with the processor, to cause the apparatus to use an opportunistic scheduling algorithm to control scheduling.

27. The apparatus of claim 25, wherein the memory and the computer program code are further configured, with the processor, to cause the apparatus to use a round-robin based fair scheduling to control scheduling.

28. A scheduling module for a radio system, comprising:
estimation means for estimating an ergodic sum capacity of multiple access channels based on estimated second or higher order statistics of each user terminal in a set of user terminals to be served;
estimation means for estimating a scheduling metric based on the estimated ergodic sum capacity; and
processing means for providing information for controlling scheduling based on the estimated scheduling metric.

29. The scheduling module of claim 28, wherein the estimated scheduling metric has the form of:

$$C_S(\rho) = \rho \cdot E\left\{\text{trace}\left(\sum_{i \in S} H_i H_i^H\right)\right\} - \frac{\rho^2}{2} \cdot E\left\{\text{trace}\left(\left(\sum_{i \in S} H_i H_i^H\right)^2\right)\right\}$$

where $\rho$ is a tuning constant, E is a mathematical expectation, $H_i$ is a channel for user terminal i, and $H_i^H$ is a Hermitian conjugate of $H_i$.

30. A computer program on a computer-readable medium having computer executable components for executing a computer process for scheduling, the process comprising:
providing an estimated second or higher order statistics for each user terminal in a set of user terminals to be served;
estimating an ergodic sum capacity of multiple access channels based on estimated second or higher order statistics;
estimating a scheduling metric based on the estimated ergodic sum capacity; and
controlling scheduling based on the estimated scheduling metric.

31. The computer program of claim 30, wherein computer-readable medium comprises at least one of the following media: a program storage medium, a record medium, a computer readable memory, a computer readable software distribution package, and a computer readable compressed software package.

* * * * *